Patented June 26, 1923.

1,459,733

UNITED STATES PATENT OFFICE.

GERALD EDWIN HUGHES, SR., OF KANSAS CITY, MISSOURI.

DRIER OR FILLER FOR PAINTS AND METHOD OF MAKING THE SAME.

No Drawing. Original application filed February 14, 1921, Serial No. 444,935. Divided and this application filed March 17, 1922. Serial No. 544,680.

*To all whom it may concern:*

Be it known that I, GERALD EDWIN HUGHES, Sr., a citizen of the United States, and a resident of Kansas City, in the county of Jackson and State of Missouri, have invented certain new and useful Improvements in a Drier or Filler for Paints and Methods of Making the Same; and I do hereby declare that the following is a full, clear, and exact description of the same.

This application is a division of my application, Serial No. 444,935, filed February 14th, 1921, for "Process for treating oils."

It is an object of this invention to provide a method for the production of a substance having glue for its base and having incorporated therewith other ingredients that shall make a good paint filler. The glue spoken of is not ordinary glue, but the residue from glue that has been used in the process for treating oils, referred to above.

It is a further object of this invention to provide a process by which a substance may be prepared from glue which may be combined with resin or other vehicle and litharge, or other drying agent, to make a paint filler or drier.

Other and further important objects of this invention will be apparent from the disclosures in the following specification.

In the treatment of oils as set forth in the above mentioned application, linseed oil and glue are heated together, the glue being supported at the surface of the oil with about one-third (⅓) of its volume submerged during the latter part of the process. Glue that has been thus treated with linseed oil may be soaked in water and treated with kerosene in much the same way, or it may be used directly after the first treatment.

The glue which has been treated with linseed oil, or with linseed oil and kerosene is permitted to cool and dry, and then is ground and mixed with litharge and resin. The mixture is heated until the resin melts. The melted resin then unites with the glue and the litharge. The result is permitted to cool and again ground, and then is ready to market.

This substance is capable of acting as a filler for paints and varnishes and also has a drying effect thereon. Even if the litharge be omitted, the treated glue has some drying action. The litharge has its usual drying effect. The resin serves as a vehicle by which the glue and the litharge are united into one substance, and also serves its usual purpose as a gum to assist in producing a good filler for paints.

It will be evident from the foregoing statement of the effect of the several constituents that no special proportions need be employed, but that the proportions of the ingredients may be varied according to the result desired.

Throughout the specification and claims wherever resin is mentioned, it is to be understood as including any substance commonly called by this name, whether common rosin, colephony or any other resin.

I am aware that many changes may be made, and numerous details of procedure may be varied through a wide range without departing from the principles of this invention, and I therefore do not purpose limiting the patent granted, otherwise than necessitated by the prior art.

I claim as my invention:

1. A method of making a paint drier and filler including heating linseed oil with a quantity of glue, whereby portions of the glue react with the oil, treating the remaining part of the glue with a quantity of kerosene and heating the residue with resin and litharge.

2. A filler for paint including glue preliminarily treated with linseed oil and kerosene, and then combined with resin and litharge.

3. A filler for paints comprising a drying agent, a gum, and the residue resulting from treating glue with hot oil.

4. The method of preparing a filler for paints which consists in heating glue with oil, separating the residue of the glue from the oil, mixing the same with resin and litharge, heating the mixture above the melting point of the resin, allowing the result to cool, and then grinding it.

In testimony whereof I have hereunto subscribed my name in the presence of two subscribing witnesses.

GERALD EDWIN HUGHES, SR.

Witnesses:
N. BYARS,
P. PERKINS.